No. 696,385.  
J. C. WANDS.  
SIDE BEARING FOR RAILWAY CARS.  
(Application filed Nov. 19, 1901.)  
Patented Mar. 25, 1902.
(No Model.)  
2 Sheets—Sheet 1.
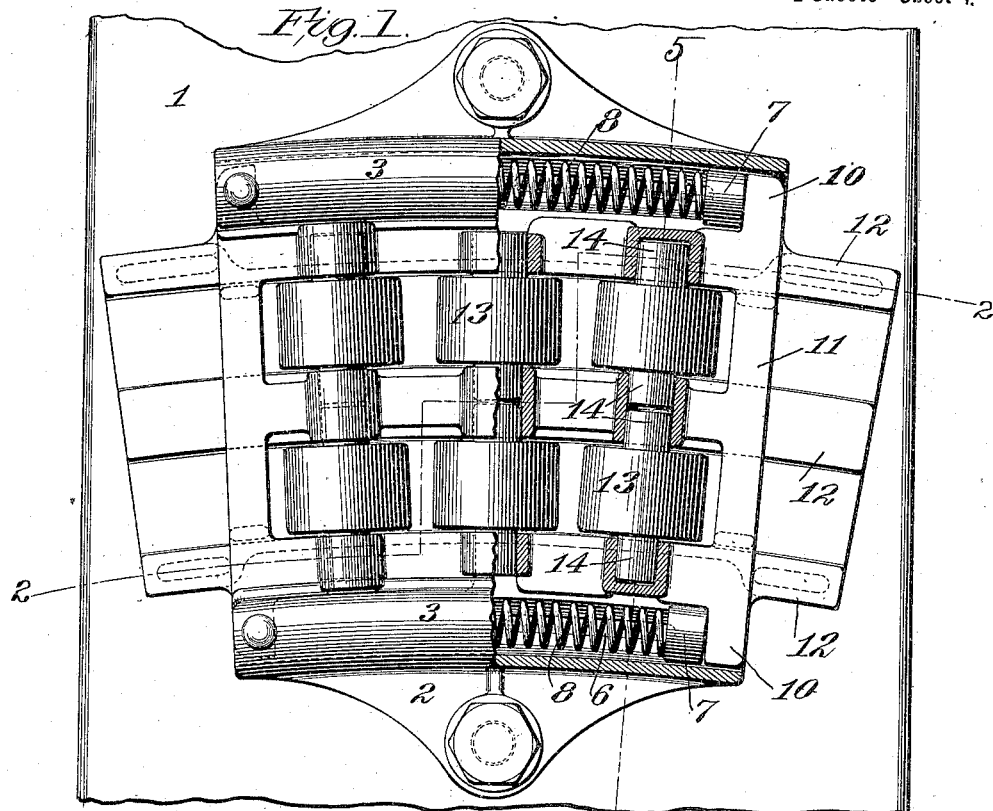
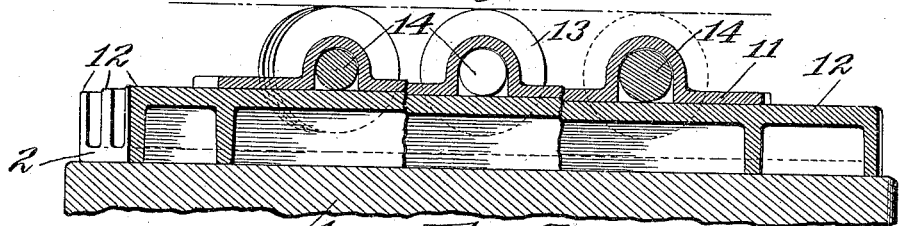
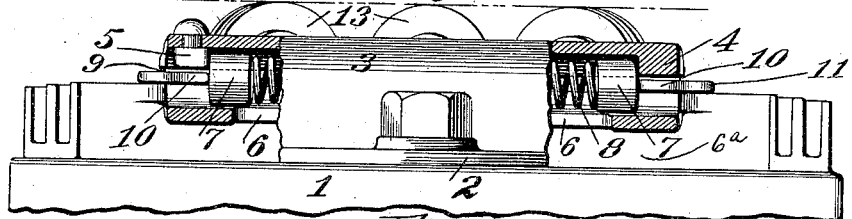
Witnesses:  
Wm H Scott  
George Bakewell  
Inventor:  
John C Wands,  
by Bakewell Cornwall  
Attys.

No. 696,385. Patented Mar. 25, 1902.
J. C. WANDS.
SIDE BEARING FOR RAILWAY CARS.
(Application filed Nov. 19, 1901.)
(No Model.) 2 Sheets—Sheet 2.

Witnesses:
Wm H Scott
George Bakewell

Inventor:
John C. Wands,
by Bakewell & Cornwall
attys.

UNITED STATES PATENT OFFICE.

JOHN C. WANDS, OF ST. LOUIS, MISSOURI.

SIDE BEARING FOR RAILWAY-CARS.

SPECIFICATION forming part of Letters Patent No. 696,385, dated March 25, 1902.

Application filed November 19, 1901. Serial No. 82,917. (No model.)

*To all whom it may concern:*

Be it known that I, JOHN C. WANDS, a citizen of the United States, residing at the city of St. Louis, State of Missouri, have invented a certain new and useful Improvement in Side Bearings for Railway-Cars, of which the following is a full, clear, and exact description, such as will enable others skilled in the art to which it appertains to make and use the same, reference being had to the accompanying drawings, forming part of this specification, in which—

Figure 5:
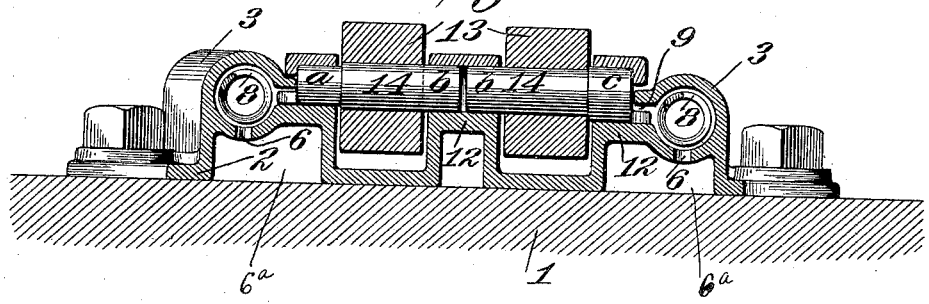
Figure 6:
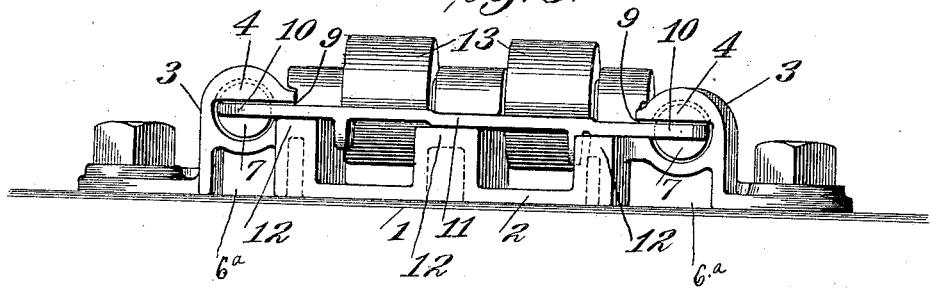
Figure 7:
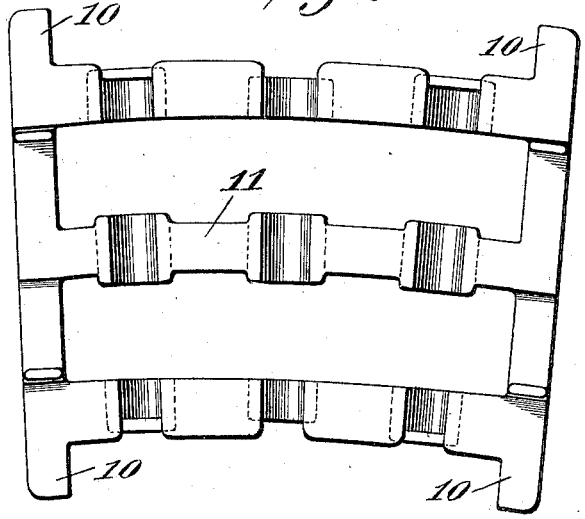

Figure 1 is a top plan view of my improved side bearing, a part of same being shown in horizontal section. Fig. 2 is a sectional view on line 2 2, Fig. 1. Fig. 3 is a side elevational view, the spring-housings at each end being shown in section. Fig. 4 is a side elevational view of the spacing-plate removed. Fig. 5 is a sectional view on line 5 5, Fig. 1. Fig. 6 is an end elevational view, and Fig. 7 is an inverted plan view, of the spacing plate or frame.

This invention relates to a new and useful improvement in roller side bearings for cars, the object being to construct a plate in such manner that a greater travel of the upper bearing member is permitted relative to the travel of the antifriction devices, whereby the antifriction devices are located under the upper member of the side bearing at all times and in their travel do not pass beyond the edges of the truck-bolster. In my present construction the peripheries of the burden-carrying rollers do not bear upon a track-plate; but said rollers are provided with reduced portions in the form of axles which are supported upon tracks in such manner that the relative travel of the upper member as compared to the distance of movement of the rollers in a horizontal direction is in the ratio of the length of the diameter of the enlarged portions of the rollers to the length of the diameter of the reduced portions or axles of said rollers.

With these objects in view my invention consists in the construction, arrangement, and combination of the several parts, all as will hereinafter be described and afterward pointed out in the claims.

In the drawings, 1 indicates the bolster.

2 indicates the base-plate, preferably in the form of a malleable casting provided with perforated lugs, whereby it may be attached to the bolster.

3 indicates spring-housings arranged at each side of the casting 2, said housings having end walls 4, forming fixed abutments, and removable abutments 5 at the opposite ends of the housings, said removable abutments permitting the springs and their followers to be introduced through one end of the housing. Each spring-housing is also preferably provided with a slot 6 in its bottom wall, whereby dirt, &c., is permitted to escape. These slots 6 discharge into channels $6^a$, extending under the spring-housings, said channels being open at each end, whereby the air is permitted to sweep therethrough and remove the dust falling into the channels through these slots 6. In this way the channels are kept clean.

7 indicates spring-followers arranged in the housings, which are designed to coöperate with the fixed abutments 4 and 5. Between these spring-followers are springs 8, whose function is to restore the antifriction device to a central position. The inner walls of these spring-housings are slotted, as at 9, for the purpose of permitting the play of projections 10 on the roller-spacing frame 11. There is a projection 10 at each corner of the frame coöperating with the spring-followers, whereby when the frame is moved in either direction the springs at the opposite sides of the device are compressed and energy stored in said springs to center the frame 11 when the rollers are relieved.

The casting 2 referred to is provided with tracks 12, preferably concentric to the king-pin of the truck. These tracks are preferably made integral with the casting, but may be separable, if desired. As shown in Fig. 2, the tracks, of which there are three illustrated in the drawings, are of different heights, the inner track being the highest, while the outer track is the lowest. These tracks support what I will call the "axles" of rollers 13. These axles are fixed to the rollers and are in reality reduced portions thereof. Referring to Fig. 5, it will be observed that the axles are made separate from the rollers and that the bearing ends of the axles, which are designated as 14, have different diameters, the bearing ends resting upon the inner (or highest) track being smallest, while the contiguous ends of the axles or alined rollers which bear upon the middle track are of the same diameter, but larger than the inner bearing ends, and the bearing ends which rest upon the outer (or lowest) track are the largest in diameter. These differences in the diameters of the bearing ends of the axles compensate for the difference in travel of the ends of the axles moving in different arcs described from the same center. In order to reduce the cost of manufacture, all of the rollers 13 are preferably of the same diameter and have openings through their centers of the same diameter. The body portions of the axles are of such size as to fit tightly in the openings in the rollers designed to receive them, said axles protruding on each side of said rollers, and in manufacture one set of axles has a reduced end, (indicated at $a$,) while the other set has an enlarged end, (indicated at $c$.) The opposite ends $b$ of both sets of axles are of the same diameter and rest upon the middle track, the reduced ends of one set resting upon the high track and the enlarged ends of the other set resting upon the low track.

The frame 11 referred to is in skeleton form and is provided with semicircular recesses on its under side for receiving the bearing ends of the axles for the purpose of spacing the rollers a proper distance apart. The ends of some of these recesses may have walls for preventing endwise movement of the rollers. These recesses are in radial alinement and serve to maintain the axes of the rollers radial to the king-pin of the truck in all positions. As shown in Fig. 4, the frame 11 is constructed so as to rest upon the tracks of different heights, and in operation said frame is designed to travel with the rollers, and in so doing it will compress the restoring-springs, so that when the rollers are relieved of load the restoring-springs will center the frame and its carried rollers.

Referring to Fig. 2, it will be observed that the centers of all of the rollers lie in the same horizontal plane, whereby the peripheries of said rollers can coöperate with the flat horizontal face of the upper member of the bearing, that the rollers rotate independently of each other, that the differences in the diameters of the inner and outer bearing ends of the axles of the respective sets of rollers cause them to travel in an arc of a circle with the least possible friction, that the frame 11 maintains the rollers in radial position with respect to the king-pin of the truck at all times, said frame being guided in its movement by the spring-housings, and that when the rollers, which may be designated as "antifriction devices," are shifted to either side the distance of travel of the upper member of the side bearing riding upon the rollers in a horizontal direction is proportionately greater than the distance of movement of the centers of the rollers as the difference between the diameters of said rollers and their bearing-axles. For illustration, if in actual practice the enlarged portion of the rollers was one and one-half inches in diameter the travel of the upper bearing member in imparting one complete revolution to said rollers would be approximately 4.71 inches. If the reduced inner bearing end riding upon the high track was one-half an inch in diameter, the distance of travel in horizontal direction or the displacement of this bearing end would be about 1.57 inches, being in the ratio of one to three as compared to the travel in a horizontal direction of the upper bearing member. If the outer bearing end of the axles of the inner set of rollers was nine-sixteenths of an inch in diameter, the displacement of this end of the roller due to this increased diameter of its bearing end would exceed the displacement of the inner bearing end .197 inch or the distance of travel would be approximately 1.67 inches as compared to 1.57 inches of the inner end. With respect to the outer set of rollers, if the inner bearing end was nine-sixteenths of an inch and its travel was 1.67 inches and the outer bearing end was five-eighths of an inch in diameter its travel would be 1.96 inches, this increased diameter of the outer end of the respective rollers compensating in each instance for the difference in the arc of the circle, causing the outer bearing ends of the axle to travel a greater distance, relieving the rollers and their bearing-axles of friction, and preventing the bearing ends of the axles, which are housed in the frame 11, from binding in said frame.

The differential travel of the antifriction device and the upper member of the side bearing is of great advantage in railway rolling-stock, where the trucks are forced to follow track curves of short radii, as the antifriction device never in its travel passes beyond the edges of the truck-bolster, but always occupies a position above said bolster to transmit the load imparted through the upper bearing member directly onto the bolster. Furthermore, by this construction due to the limited travel of the antifriction devices the bolster is not subjected to excessive torsional strains.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent of the United States, is—

1. In a side bearing for cars, the combination with a cylindrical antifriction-roller, and means for causing an unequal circumferential travel of the ends of said roller; substantially as described.

2. In a side bearing for cars, the combination with a cylindrical antifriction-roller, and means for causing the outer end of said roller to travel at a greater circumferential speed than the inner end; substantially as described.

3. In a side bearing for cars, a cylindrical antifriction-roller having reduced ends of different diameters; substantially as described.

4. In a side bearing for cars, a cylindrical antifriction-roller having cylindrical axles, the axle at the outer end of said roller being of greater diameter than the axle at the inner end; substantially as described.

5. In a side bearing for cars, the combination with curved tracks having horizontally-disposed treads, and a cylindrical antifriction-roller mounted to travel on said curved tracks, the bearing ends of said roller traveling at unequal circumferential speeds; substantially as described.

6. In a side bearing for cars, the combination with a curved track, and an antifriction-roller having cylindrical bearing-axles of different diameters coöperating with said track, whereby the roller is caused to travel in a curved path; substantially as described.

7. In a side-bearing for cars, the combination with a track, and a cylindrical antifriction-roller provided with bearing-axles of different diameters coöperating with said track; substantially as described.

8. In a side bearing for cars, the combination with curved tracks, and a cylindrical antifriction-roller mounted between said tracks and having cylindrical bearing-axles of different diameters coöperating with said tracks; substantially as described.

9. In a side bearing for cars, the combination with flat-surfaced tracks of different heights, of a cylindrical antifriction-roller arranged between said tracks and cylindrical bearing-axles of different diameters coöperating with said tracks; substantially as described.

10. In a side bearing for cars, the combination with tracks, of rollers on said tracks, a frame coöperating with said rollers, a spring-housing for guiding said frame in its movement, and a centering-spring in said housing, said spring-housing having slots in its bottom wall for the escape of dirt, dust, &c.; substantially as described.

11. In a side bearing for cars, the combination with tracks, of spring-housings arranged parallel thereto, rollers on said tracks, springs in said housings for centering said rollers, openings in the bottom walls of the spring-housings for the escape of dust, dirt, &c., and open-ended channels for receiving the dirt, dust, &c. falling through said openings; substantially as described.

12. In a side bearing for cars, the combination with tracks, of rollers arranged thereon, centering-springs for said rollers, slotted housings for said centering-springs, and means for keeping the spring-housings free from dirt; substantially as described.

13. In a side bearing for cars, the combination with curved tracks of different heights, of a cylindrical antifriction-roller, and cylindrical bearing-axles of different diameters at the ends of said roller for supporting the same between the curved tracks, whereby the peripheral speed of the roller is greater than the peripheral speed of the bearing-axles; substantially as described.

14. In a side bearing for cars, the combination with tracks, of spring-housings arranged outside thereof, and formed with slots in their bottom walls, rollers on said tracks, a frame for spacing said rollers, centering-springs in the housings coöperating with said frame, and channels 6ª under the spring-housings; substantially as described.

15. In a side bearing for cars, the combination with an antifriction-roller, means for causing the ends of said roller to travel at different circumferential speeds, and means for returning said roller to a normal position after displacement; substantially as described.

16. In a side bearing for cars, the combination with an antifriction-roller, whose outer end has a greater circumferential speed than its inner end, and means for returning said roller to a normal position after displacement; substantially as described.

17. In a side bearing for cars, the combination with an antifriction-roller having reduced ends of different diameters, and resilient means for returning said roller to a normal position after displacement; substantially as described.

18. In a side bearing for cars, the combination with an antifriction-roller having protruding axles, the axle at the outer end of said roller being of greater diameter than the axle at the inner end, and resilient means for returning said roller to a normal position after displacement; substantially as described.

19. In a side bearing for cars, the combination with a curved track, of an antifriction-roller having reduced cylindrical spindles of different diameters mounted to travel on said track, and means for returning said roller to a normal position after displacement; substantially as described.

20. In a side bearing for cars, the combination with a curved track, of an antifriction-roller having cylindrical bearing-axles of different diameters coöperating with said track, whereby the roller is caused to travel in a curved path, and means for returning said roller to a normal position after displacement; substantially as described.

21. In a side bearing for cars, the combination with tracks of different heights, of a roller mounted upon said tracks and having cylindrical spindles of different diameters coöperating with said tracks, and means for returning said roller to a normal position after displacement; substantially as described.

22. In a side bearing for cars, the combination with tracks of different heights, of a roller arranged between said tracks and having bearing-axles of different diameters coöperating with said tracks, and means for returning said roller to a normal position after displacement; substantially as described.

23. In a side bearing for cars, the combination with a plurality of tracks, independently-rotatable antifriction-rollers having bearing-axles supported by said tracks, and a frame coöperating with said rollers for maintaining proper relation thereof to each other; substantially as described.

24. In a side bearing for cars, the combination with a plurality of tracks, of independently-rotatable rollers whose bearing-axles are supported by said tracks, and a frame for receiving the bearing-axles of said rollers, said frame moving with said rollers and maintaining them in proper relation to each other; substantially as described.

25. In a side bearing for cars, the combination with a plurality of tracks, of rollers arranged in sets between said tracks, said rollers being independently rotatable, and a frame for maintaining the axes of rotation of all of said rollers in radial alinement with the king-pin of the truck; substantially as described.

26. In a side bearing for cars, the combination with a plurality of curved tracks, of rollers arranged between said tracks, bearing-axles carrying said rollers and supported by said tracks, said bearing-axles at the opposite ends of the rollers being of unequal diameters, and a frame for spacing said rollers apart; substantially as described.

27. In a side bearing for cars, the combination with a plurality of curved tracks, of antifriction-rollers arranged in sets between said tracks, all of said rollers being independently rotatable, bearing-axles for carrying said rollers, the bearing ends of said axles being of unequal diameter, and a frame for housing in the bearing ends of said axles and spacing said rollers apart; substantially as described.

28. In a side bearing for cars, the combination with a plurality of tracks, of sets of rollers arranged between said tracks and supported thereon by axles of smaller diameter than said rollers, a frame for spacing said rollers apart, and resilient means coöperating with the frame for restoring the same and said rollers to a central position after operation; substantially as described.

29. In a side bearing for cars, the combination with curved tracks, of rollers arranged between said tracks and having bearing-axles supported by said tracks, means for causing said rollers to travel in an arc of a circle, a frame for spacing said rollers apart, and springs at each side of said frame for restoring the same and the said rollers to a central position; substantially as described.

30. In a side bearing for cars, the combination with curved tracks of different heights, of rollers having bearing-axles of different diameters supported by said tracks, a frame coöperating with said rollers to space the same, springs at opposite sides of said frame, and fixed abutments with which said springs coöperate; substantially as described.

31. In a side bearing for cars, the combination with a casting formed with spring-housings at each side and a plurality of curved tracks, of antifriction-rollers mounted between said tracks, a frame for spacing said rollers apart, springs in said housings, fixed abutments, and spring-followers with which said frame coöperates; substantially as described.

32. In a side bearing for cars, the combination with spring-housings, of curved tracks between said housings, antifriction-rollers mounted between said tracks, a frame coöperating with said antifriction-rollers, springs in said housings for coöperating with said frame, and fixed abutments against which the ends of the springs are seated, one of said fixed abutments being removable; substantially as described.

33. In a side bearing for cars, the combination with a plurality of tracks, of rollers mounted between said tracks and having axles supported by the tracks, of a frame for spacing said rollers apart, means for guiding said frame in its movement, and centering devices for restoring the frame and said rollers to normal position; substantially as described.

34. In a side bearing for cars, an antifriction-roller having a cylindrical axle formed with different diameters; substantially as described.

35. In a side bearing for cars, an antifriction-roller having a cylindrical axle formed with a reduced portion at one end; substantially as described.

36. In a side bearing for cars, an antifriction-roller having a cylindrical axle formed with an enlarged portion at one end; substantially as described.

37. In a side bearing for cars, antifriction-rollers provided with axles whose body portions are of uniform diameter throughout a greater portion of their length, the projecting end of one of said axles being reduced and the projecting end of the other of said axles being increased in diameter, in combination with tracks for supporting the projecting ends of said axles; substantially as described.

In testimony whereof I hereunto affix my signature, in the presence of two witnesses, this 15th day of November, 1901.

JOHN C. WANDS.

Witnesses:
FREDERICK R. CORNWALL,
GEORGE BAKEWELL.